US009654480B2

(12) United States Patent
Dorfman et al.

(10) Patent No.: US 9,654,480 B2
(45) Date of Patent: *May 16, 2017

(54) SYSTEMS AND METHODS FOR PROFILING CLIENT DEVICES

(71) Applicant: AOL INC., Dulles, VA (US)

(72) Inventors: Scott Dorfman, Reston, VA (US); Richard Rodriguez-Val, Fairfax, VA (US)

(73) Assignee: AOL Inc., Dulles, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/186,858

(22) Filed: Jun. 20, 2016

(65) Prior Publication Data

US 2016/0323292 A1    Nov. 3, 2016

Related U.S. Application Data

(63) Continuation of application No. 14/563,886, filed on Dec. 8, 2014, now Pat. No. 9,374,372, which is a
(Continued)

(51) Int. Cl.
*H04L 29/06* (2006.01)
*H04L 29/08* (2006.01)

(52) U.S. Cl.
CPC ........ *H04L 63/105* (2013.01); *H04L 63/0876* (2013.01); *H04L 63/102* (2013.01); *H04L 67/02* (2013.01); *H04L 2463/121* (2013.01)

(58) Field of Classification Search
CPC . H04L 63/0876; H04L 63/105; H04L 63/102; H04L 2463/121; H04L 67/02
(Continued)

(56) References Cited

U.S. PATENT DOCUMENTS 8,516,573 B1    8/2013  Brown et al.
8,539,576 B2    9/2013  Van Der Merwe et al.
(Continued)

FOREIGN PATENT DOCUMENTS

EP    1 855 208 A1    11/2007

OTHER PUBLICATIONS

Invitation to Pay Additional Fees and, Where Applicable, Protest Fee with Partial International Search Report, mailed Mar. 6, 2013 in International Application No. PCT/US2012/070309 (4 pages).
(Continued)

*Primary Examiner* — Kambiz Zand
*Assistant Examiner* — Aubrey Wyszynski
(74) *Attorney, Agent, or Firm* — Finnegan, Henderson, Farabow, Garrett & Dunner LLP

(57) ABSTRACT

Systems and methods are provided for providing generating and managing profiles. Such systems and methods may be implemented to control access to a function of a web server or site based on a level of trust associated with a user or device profile. According to one exemplary method, session information associated with a request to access a function of a web server is identified. At least one processor determines whether the request is associated with a trusted device profile based on the at least the session information. Access to the requested function is provided when the request is associated with a trusted device profile.

20 Claims, 13 Drawing Sheets

Related U.S. Application Data continuation of application No. 13/714,745, filed on Dec. 14, 2012, now Pat. No. 8,910,254.

(60) Provisional application No. 61/597,747, filed on Feb. 11, 2012.

(58) Field of Classification Search
USPC .......................................................... 726/4
See application file for complete search history.

(56) References Cited

U.S. PATENT DOCUMENTS

| | | | |
|---|---|---|---|
| 8,910,254 B2* | 12/2014 | Dorfman | H04L 67/02 726/5 |
| 9,374,372 B2* | 6/2016 | Dorfman | H04L 67/02 |
| 2007/0186104 A1 | 8/2007 | Suzuki | |

OTHER PUBLICATIONS

Partial International Search Report mailed by the European Patent Office on Mar. 6, 2013, in International Application No. PCT/US2012/070309 (2 pages).

International Search Report and Written Opinion mailed by the European Patent Office on Apr. 29, 2013, in International Application No. PCT/US2012/070309 (12 pages).

* cited by examiner

SYSTEMS AND METHODS FOR PROFILING CLIENT DEVICES

CROSS-REFERENCE TO RELATED APPLICATIONS

This application is a continuation of U.S. application Ser. No. 14/563,886 (now allowed), filed Dec. 8, 2014, which is a continuation of U.S. patent application Ser. No. 13/714, 745, (now U.S. Pat. No. 8,910,254) filed Dec. 14, 2012, which claims the benefit of priority to U.S. Provisional Patent Application No. 61/597,747, filed Feb. 11, 2012. The disclosures of the above applications are expressly incorporated herein by reference in their entireties.

BACKGROUND

Technical Field

The present disclosure generally relates to techniques for profiling client devices by, for example, collecting and analyzing session data. More particularly, and without limitation, the present disclosure relates to systems and methods for determining a trust level associated with the user of a client device, and for providing access to a function of a web site or server based on the trust level.

Background Information

Today, users are often required to generate and subsequently enter login credentials to access or fully interact with web sites that provide online content and/or services. The same is true for accessing secure servers or online data storage systems. These login credentials are often far from uniform, and many users must commit multiple case-specific sets of login credentials to browse and interact with web sites of Interest.

Users, however, often are unable to remember one or more sets of these login credentials. For example, a user may remember a login for a web site associated with a news organization or financial institution, but may be unable to remember to corresponding password. In such instances, to retrieve the forgotten password, the user must answer a cumbersome set of "security" or "challenge" questions having case-specific answers. As the user may have initially supplied answers to these question many months or even years ago, the user often engages in an iterative process to determine not only the proper answer to the question, but a proper format of that answer. This iterative process is both time consuming and frustrating to the user, and in practice, is associated with a low success rate.

In view of the foregoing, there is a need for improved systems and methods for providing access to a function of a web server or web page based on a trust level associated with a user and a corresponding device. There is also a need for improved systems and methods for profiling client devices. Such systems and methods may be implemented in computer-based environments, such as the Internet and network environments that provide online content and/or services to users.

SUMMARY

Consistent with embodiments of the present disclosure, a computer-implemented method is provided. The method includes, among other things, identifying session information associated with a request to access a function of a web server. The session information may include an identifier of a user and a device identifier associated with the request. The method further includes determining, using at least one processor, whether the request is associated with a trusted device profile based on the at least the session information, and providing access to the requested function, when the request is associated with a trusted device profile.

Consistent with additional embodiments of the present disclosure, an apparatus is provided that includes a storage device and at least one processor coupled to the storage device. The storage device stores a program for controlling the at least one processor, and the at least one processor, being operative with the program, is configured to identify session information associated with a request to access a function of a web server. The session information may include an Identifier of a user and a device identifier associated with the request. The at least one processor is further configured to determine whether the request is associated with a trusted device profile based on the at least the session information, and provide access to the requested function, when the request is associated with a trusted device profile.

Consistent with still further embodiments of the present disclosure, a tangible, non-transitory computer-readable medium stores instructions that, when executed by at least one processor, perform steps including identifying session information associated with a request to access a function of a web server. The session information may include an identifier of a user and a device identifier associated with the request. The instructions further cause the processor to perform other steps including determining whether the request is associated with a trusted device profile, based on the at least the session information, and providing access to the requested function, when the request is associated with a trusted device profile.

Consistent with yet another embodiment of the present disclosure, a computer-implemented method is provided. The method includes, among other things, identifying an existing device profile based on session information. The existing device profile may be associated with a number of day sessions. The method further includes determining, using at least one processor, whether number of day sessions exceeds a threshold value. The method also includes promoting the existing device profile to a pending device profile, based on at least the determination, and establishing, using the at least one processor, a trusted device profile based on the pending device profile.

Consistent with a further embodiment of the present invention, an apparatus includes a storage device and at least one processor coupled to the storage device. The storage device stores a program for controlling the at least one processor, and the at least one processor, being operative with the program, is configured to identify an existing device profile based on session information. The existing device profile may be associated with a number of day sessions. The at least one processor is further configured to determine whether number of day sessions exceeds a threshold value, and promote the existing device profile to a pending device profile, based on at least the determination. The at least one processor is further configured to establish a trusted device profile based on the pending device profile.

Consistent with embodiments of the present invention, a tangible, non-transitory computer-readable medium stores instructions that, when executed by at least one processor, perform a method comprising the steps of identifying an existing device profile based on session information. The existing device profile may be associated with a number of day sessions. The method includes determining whether number of day sessions exceeds a threshold value, and promoting the existing device profile to a pending device profile, based on at least the determination. The method includes establishing a trusted device profile based on the pending device profile.

It is to be understood that both the foregoing general description and the following detailed description are exemplary and explanatory only, and are not restrictive of embodiments consistent with the present disclosure. Further, the accompanying drawings, which are incorporated in and constitute a part of this specification, illustrate embodiments of the present disclosure and together with the description, serve to explain principles of the present disclosure.

DESCRIPTION OF THE EMBODIMENTS

Reference will now be made in detail to embodiments of the present disclosure, examples of which are illustrated in the accompanying drawings. The same reference numbers will be used throughout the drawings to refer to the same or like parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the subject matter described.

Figure 1:
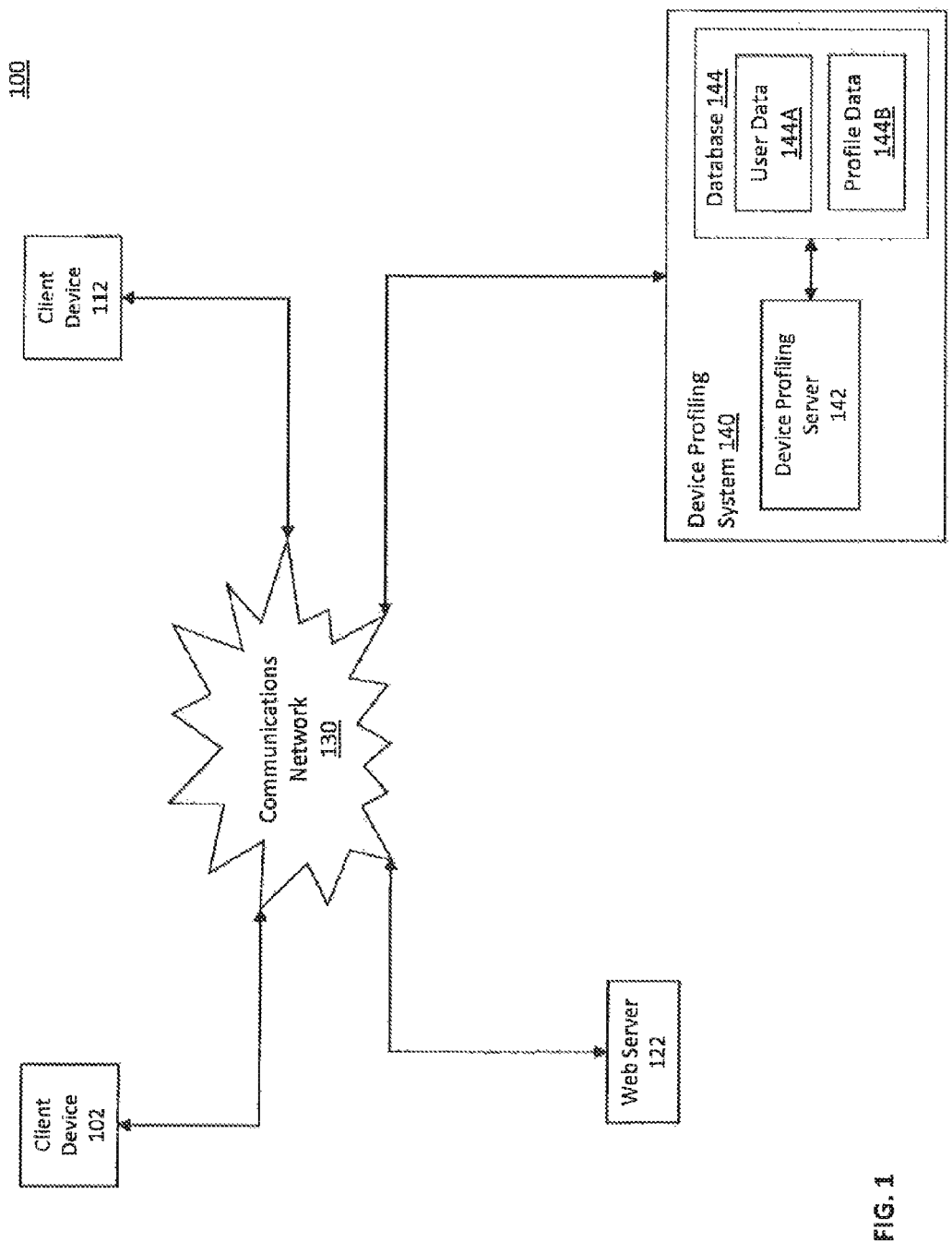
FIG. 1 is a diagram of an exemplary computing environment for practicing embodiments consistent with the present disclosure.

FIG. 1 illustrates an exemplary computing environment 100 for practicing embodiments of the present disclosure. As shown in FIG. 1, a device profiling system 140, a web server 122, a client device 102, and a mobile client device 112 are interconnected via a communications network 130. In one embodiment, client devices 102 and 112 can include, but are not limited to, a personal computer, a laptop computer, a notebook computer, a hand-held computer, a personal digital assistant, a portable navigation device, a mobile phone, a smart phone, and any additional or alternate computing device apparent to a person of ordinary skill in the art. Although computing environment 100 includes multiple client devices in communication with device profiling system 140, it will be understood from the present disclosure that computer environment 100 may include any number of additional number of mobile or stationary client devices, any number of additional web servers, and any additional number of computers, systems, or servers.

Communications network 130 may represent any form or medium of digital data communication. Examples of communication network 130 include a local area network ("LAN"), a wireless LAN, e.g., a "WiFi" network, a wireless Metropolitan Area Network (MAN) that connects multiple wireless LANs, a wide area network ("WAN"), e.g., the Internet, and a dial-up connection (e.g., using a V.90 protocol or a V.92 protocol). In the embodiments described herein, the Internet may include any publicly-accessible network or networks interconnected via one or more communication protocols, including, but not limited to, hypertext transfer protocol (HTTP) and transmission control protocol/internet protocol (TCP/IP). Moreover, communications network 130 may also include one or more mobile device networks, such as a GSM network or a PCS network, that allow mobile devices, such as mobile client device 112, to send and receive data via applicable communications protocols, including those described above.

In FIG. 1, device profiling system 140 includes a device profiling server 142 and a database 144, which is disposed in communication within device profiling server 142. For example, device profiling server 142 and database 144 may be incorporated into a single hardware unit, for example, a single computer or a single server. In such an embodiment, database 144 may be incorporated into, or stored within, a storage medium or storage device of device profiling server 142, as described below with reference to FIG. 2. However, device profiling server 142 and database 144 are not limited to such configurations, and, in additional embodiments, database 144 may reside on any additional or alternate computer or server accessible to device profiling server 144.

In one embodiment, device profiling server 142 may include a general purpose computer (e.g., a personal computer, network computer, server, or mainframe computer) having one or more processors that may be selectively activated or reconfigured by a computer program. In additional embodiments, device profiling server 142 be incorporated as a node in a distributed network, and additionally or alternatively, as a networked server in a cloud-computing environment. Device profiling server 142 may communicate via network 130 with one or more additional servers (not shown), which may enable device profiling server 142 to distribute processes for parallel execution by the other servers.

Database 144 includes user data 144A and profile data 144B. In an embodiment, user data 144A may include a plurality of user data records that identify individual users of client devices within computing environment 100. For example, each data record of user data 144A may be associated with a user of a client device, e.g., client device 102, and may specify an identifier of the user (e.g., a user name or login information) and additionally, one or more additional login credentials of the user, e.g., a password, biometric identifier, or any additional or alternate credential appropriate to computing environment 100.

Profile data 144B may include information identifying one or more device profiles associated with users of client devices operating within computing environment 100 (e.g., one or more of client devices 102 and 112). By way of example, a device profile stored within profile data 144B may include an identifier of a user and an identifier of a client device accessible to that user (e.g., a unique numerical value assigned to client device 102 by device profiling server 142). In an embodiment, the unique numerical value assigned to client device 102 may be tracked by device profile server 142 and may be subsequently modified by device profile server 142 (e.g., upon request by the user or upon introduction of new client devices into computing environment 100).

The disclosed embodiments are, however, not limited to device profiles that directly reference physical devices. For example, in additional embodiments, a device profile stored within profile data 144B may reference a "logical entity" associated with a physical device. Such logical entities may include, but are not limited to, software installed on and executed by a client device within computing environment 100 (e.g., client device 102) and toolbars and other plug-ins executed by software installed on the client device (e.g., a plug-in executed by a web browser installed on client device 102). By way of example, a device profile associated with such a logical entity may include with an identifier of the user and a device identifier associated with the logical entity (e.g., an application serial number (ASN) associated with software installed on client device 102, or a serial number associated with a Java toolbar or similar plug-in executed by a web browser).

In such embodiments, a single client device operating within computing environment 100 may be associated with multiple device profiles stored within profile data 144B. For example, client device 102 may be associated with a device profile referencing a user of client device 102 (which includes a device identifier assigned to client device 102), and one or more additional device profiles that reference a user of corresponding logical entities executing on client device 102 or executed by software installed on client device 102.

In an embodiment, the profiles stored within profile data 144B may be associated with corresponding statuses that include, but are not limited to, "new," "pending," and "trusted." For example, the status assigned to a device profile may be based on a number of unique or consecutive calendar days during which a client device participates in a registered communications session, i.e., a number of unique or consecutive "day sessions." A registered communications session may, in such embodiments, represent a communications session for which device profiling server has collected or received session information.

In such embodiments, a "new" device profile associated with a client device indicates that the client device is associated with a single unique day session. Similarly, a "pending" device profile associated with a client device may indicate that the client device is associated with five or more unique day sessions.

Further, in such embodiments, a pending device profile may be converted into a "trusted" device profile upon additional authentication by device profiling server 142. For example, a pending device profile associated with ten or more unique day sessions within a twenty-day period may be automatically converted into a trusted device profile by device profiling server 142. Further, for example, a user of a client device associated with a pending device profile may be provided an opportunity to "opt-in" to the enhanced authentication services provided by device profiling server 142 (e.g., through a "pop-up" ad), and the pending device profile may be converted into a trusted device profile upon approval by the user.

In further embodiments, user actions may trigger the conversion of a pending device profile into a trusted device profile by device profiling server 142. For example, a user of client device 102 may log into web server 122 within a specified time period (e.g., within one hour) of a time stamp associated with a session of a just-registered user (i.e., a "just-registered" session). In such an embodiment, a pending device profile associated with client device 102 may be deemed to be trusted by device profiling server 142. The disclosed embodiments are, however, not limited to such mechanisms for establishing trusted device profiles, and in additional embodiments, device profiling server 142 may establish a trusted device profile, or convert an existing profile into a trusted device profile, using any additional technique appropriate to the enhanced authentication processes provided by device profiling server 142.

In an embodiment, a trusted device profile may specify a device identifier, and additionally, one or more trusted IP addresses and corresponding time stamps. For example, a user of a home computer may repeatedly access a web server of a content provider (e.g., web server 120) using a wireless network connection. In such an embodiment, the IP address associated with the home computer may be deemed "trusted" and stored within a corresponding trusted device profile of the home computer, when that IP address is associated with a threshold number of consecutive day sessions (e.g., ten or more). In such embodiments, the trusted IP addresses may be associated with a time stamp that identifies a last detected day session (e.g., a time at which the communications session was initiated or was terminated).

Furthermore, such trusted device profiles may specify a maximum number of trusted IP address, including, but not limited to ten trusted IP addresses. In such an embodiment, when a number of trusted IP addresses associated with a trusted device profile exceeds the maximum number, the trusted IP address with the earliest time stamp is discarded in favor of a newly-specified trusted IP address.

In additional embodiments, the list of trusted IP addresses may be filtered to eliminate those IP addresses associated with hackers. For example, each trusted IP address may be compared against a "black list" of suspicious IP addresses, and may be removed from the trusted device profiles in response in response to a matching entry within the black lists. In such embodiments, the black lists may include IP addresses of known hackers, or may alternatively target specific geographical regions in which hackers end such entities operate.

In the embodiments described above, an identifier of a user may be associated with a specified number of profiles within profile data 144B, and as such, with a corresponding number of client devices. For example, the user may be associated with ten client devices, and profile data 144B may store ten trusted device profiles associated with the user and client devices. Further, in such embodiments, each trusted device profile may be associated with a time stamp indicative of the last activity of the corresponding client device, and the trusted device profile with the earliest time stamp may be discarded in favor of a more current trusted device profile when the number of trusted device profiles exceeds the specified number. The disclosed embodiments are not, however, limited to such exemplary number of trusted device profiles, and in additional embodiments, a user and client device may be associated with any additional or alternate number of trusted, pending, and/or new device profiled within profile data 144B.

Referring back to FIG. 1, web server 122 may comprise a general purpose computer (e.g., a personal computer, network computer, server, or mainframe computer) having one or more processors that may be selectively activated or reconfigured by a computer program to perform communications protocol processing. In additional embodiments, web server 122 may be incorporated as a node in a distributed network. For example, web server 122 may communicate via network 130 with one or more additional servers (not shown), which may enable web server 122 to distribute processes for parallel execution by a plurality of other servers.

Further, although not depicted in FIG. 1, web server 122 may include a front end and a back end, which may be disposed in communication with the front end. For example, such front and back ends may be incorporated into a hardware unit, for example, a single computer or a single server. In such an exemplary embodiment, the front end may be a software application, such as a web service, executing on web server 122. However, web server 122 is not limited to such exemplary configurations, and, in additional embodiments, a front end may be executed on any computer or server separate from the back end without departing from the spirit of scope of the present disclosed embodiments.

Figure 2:
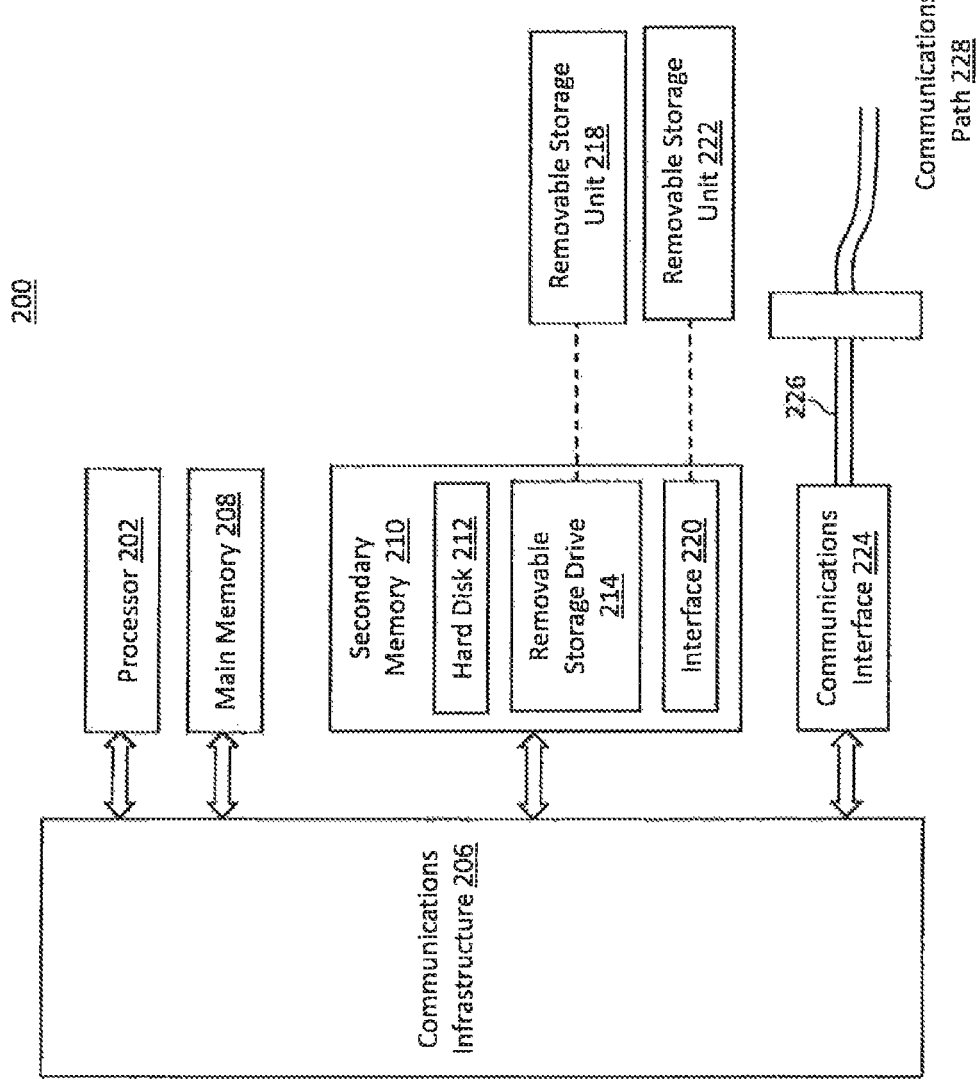
FIG. 2 is a diagram of an exemplary computer system, consistent with embodiments of the present disclosure.

Client devices 102 and 112, web server 122, and device profiling server 142, may represent any type of computer system capable of performing communication protocol processing. FIG. 2 is an exemplary computer system 200, according to an embodiment consistent with the present disclosure. Computer system 200 includes one or more processors, such as processor 202. Processor 202 is connected to a communication infrastructure 206, which may comprise a bus or network (e.g., network 130 of FIG. 1).

Computer system 200 also includes a main memory 208, for example, random access memory (RAM), and may include a secondary memory 210. Secondary memory 210 may include, for example, a hard disk drive 212 and/or a removable storage drive 214, representing a magnetic tape drive, an optical disk drive, CD/DVD drive, etc. The removable storage drive 214 reads from and/or writes to a removable storage unit 218 in a well-known manner. Removable storage unit 218 represents a magnetic tape, optical disk, or other computer-readable storage medium that is read by and written to by removable storage drive 214. As will be appreciated, the removable storage unit 218 can represent a computer-readable medium having stored therein computer programs, sets of instructions, code, or data to be executed by processor 202.

In alternate embodiments, secondary memory 210 may include other means for allowing computer programs or other program instructions to be loaded into computer system 200. Such means may include, for example, a removable storage unit 222 and an interface 220. An example of such means may include a removable memory chip (e.g., EPROM, RAM, ROM, DRAM, EEPROM, flash memory devices, or other volatile or non-volatile memory devices) and associated socket, or other removable storage units 222 and interfaces 220, which allow instructions and data to be transferred from the removable storage unit 222 to computer system 200.

Computer system 200 may also include one or more communications interfaces, such as communications interface 224. Communications interface 224 allows software and data to be transferred between computer system 200 and external devices. Examples of communications interface 224 may include a modem, a network interface (e.g., an Ethernet card), a communications port, a PCMCIA slot and card, a wireless transmitter or card, etc. Software and data may be transferred via communications interface 224 in the form of signals 226, which may be electronic, electromagnetic, optical or other signals capable of being received by communications interface 224. These signals 226 are provided to communications interface 224 via a communications path (i.e., channel 228). Channel 228 carries signals 226 and may be implemented using wire or cable, fiber optics, an RF link, wireless transmissions, and other communications channels. In an embodiment, signals 226 comprise data packets sent to processor 202. Information representing processed packets can also be sent in the form of signals 226 from processor 202 through communications path 228.

The terms "storage device" and "storage medium" may refer to particular devices including, but not limited to, main memory 208, secondary memory 210, a hard disk installed in hard disk drive 212, and removable storage units 218 and 222. Further, the term "computer-readable medium" may refer to devices including, but not limited to, a hard disk installed in hard disk drive 212, any combination of main memory 208 and secondary memory 210, and removable storage units 218 and 222, which respectively provide computer programs and/or sets of instructions to processor 202 of computer system 200. Such computer programs and sets of instructions can be stored within one or more computer readable media. Additionally or alternatively, computer programs and sets of Instructions may also be received via communications interface 224 and stored on the one or more computer readable media.

Such computer programs and instructions, when executed by processor 202, enable processor 202 to perform one or more of the computer-implemented methods described herein. Examples of program instructions include, for example, machine code, such as that code produced by a compiler, and files containing a high-level code that can be executed by processor 202 using an Interpreter.

The computer-implemented methods described herein can also be implemented on a single processor of a computer system, such as processor 202 of system 200. In another embodiment, computer-implemented methods consistent with embodiments of the Invention may be implemented using one or more processors within a single computer system, and additionally or alternatively, these computer-implemented methods may be implemented on one or more processors within separate computer systems linked via a network.

In an embodiment, the computer-implemented methods described herein may enable a user of a client device to access a function provided by web server 122, either individually or in conjunction with one or more additional servers within computing environment 100, based on a device profile stored by device profiling system 140. For example, the user of client device 102 may establish a connection with web server 122 across network 130, and may be prompted to authenticate a set of login credentials to access one or more functions associated with a provider of web server 122, as further described below with reference to FIG. 3.

Figure 3:
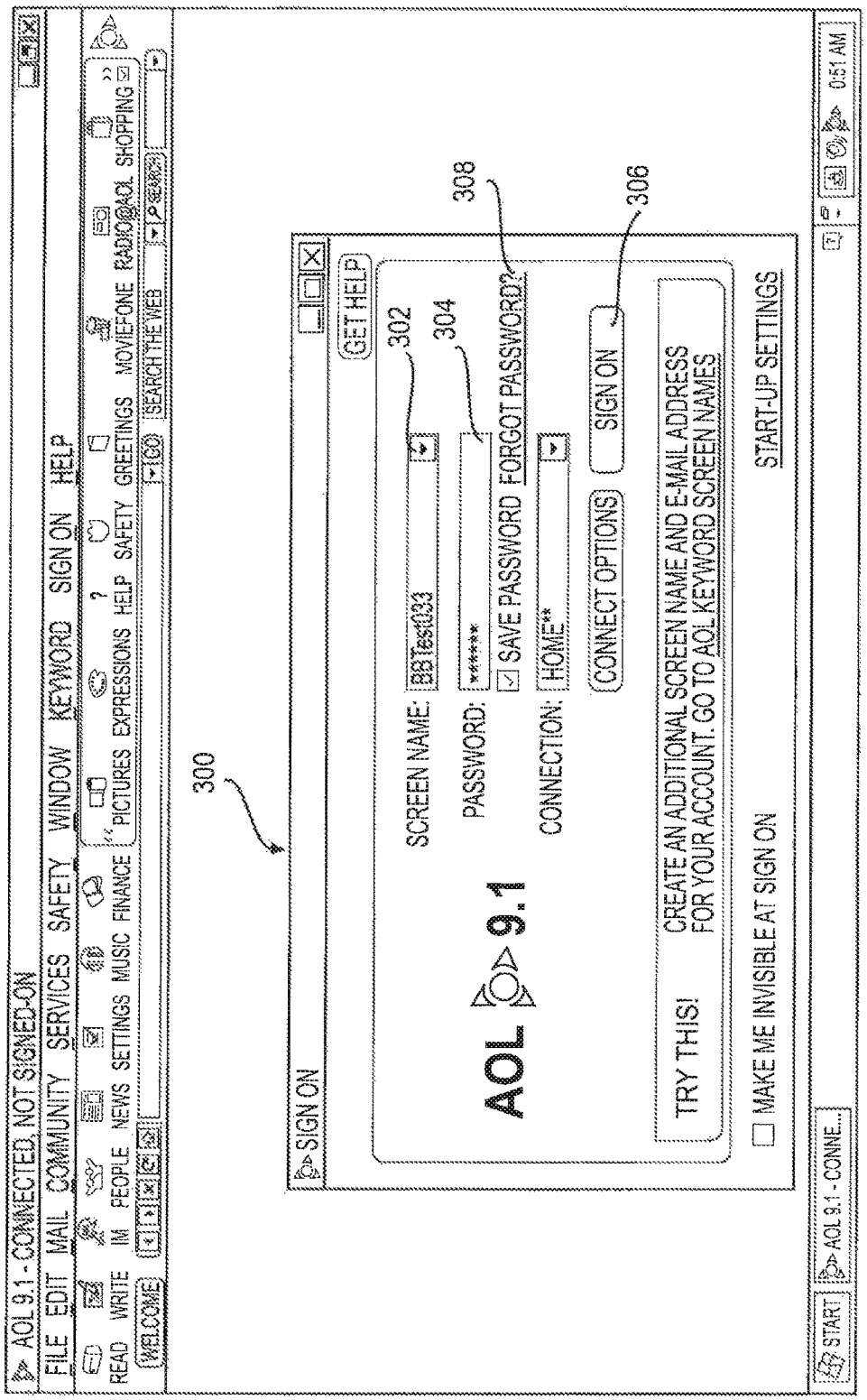
FIG. 3 illustrates an exemplary interface provided to a user by a device profiling system, consistent with embodiments of the present disclosure.

In the exemplary embodiment of FIG. 3, the user of client device 102 may be presented with an interface 300, which prompts the user to enter a user identifier 302 (e.g., a screen name) and a corresponding password 304. Upon entry of the login credentials into interface 300, the user may subsequently click or otherwise activate region 306 to log on and access the functions provided by web server 122.

The user may, however, fail to remember password 302, and in such embodiments, the user may click or otherwise activate region 308 of interface 300 to obtain a reminder of the password, or alternatively, to reset the password. Upon activation of region 308, device profiling system 140 may coordinate with web server 122 to obtain information associated with the user and with client device 102, and to subsequently determine a level of trust associated with client device 102. Based upon the determined level of trust, web server 122, in conjunction with device profiling system 140, may enable the user to change the password without requiring case-specific answers to cumbersome security questions and challenges.

Figure 4:
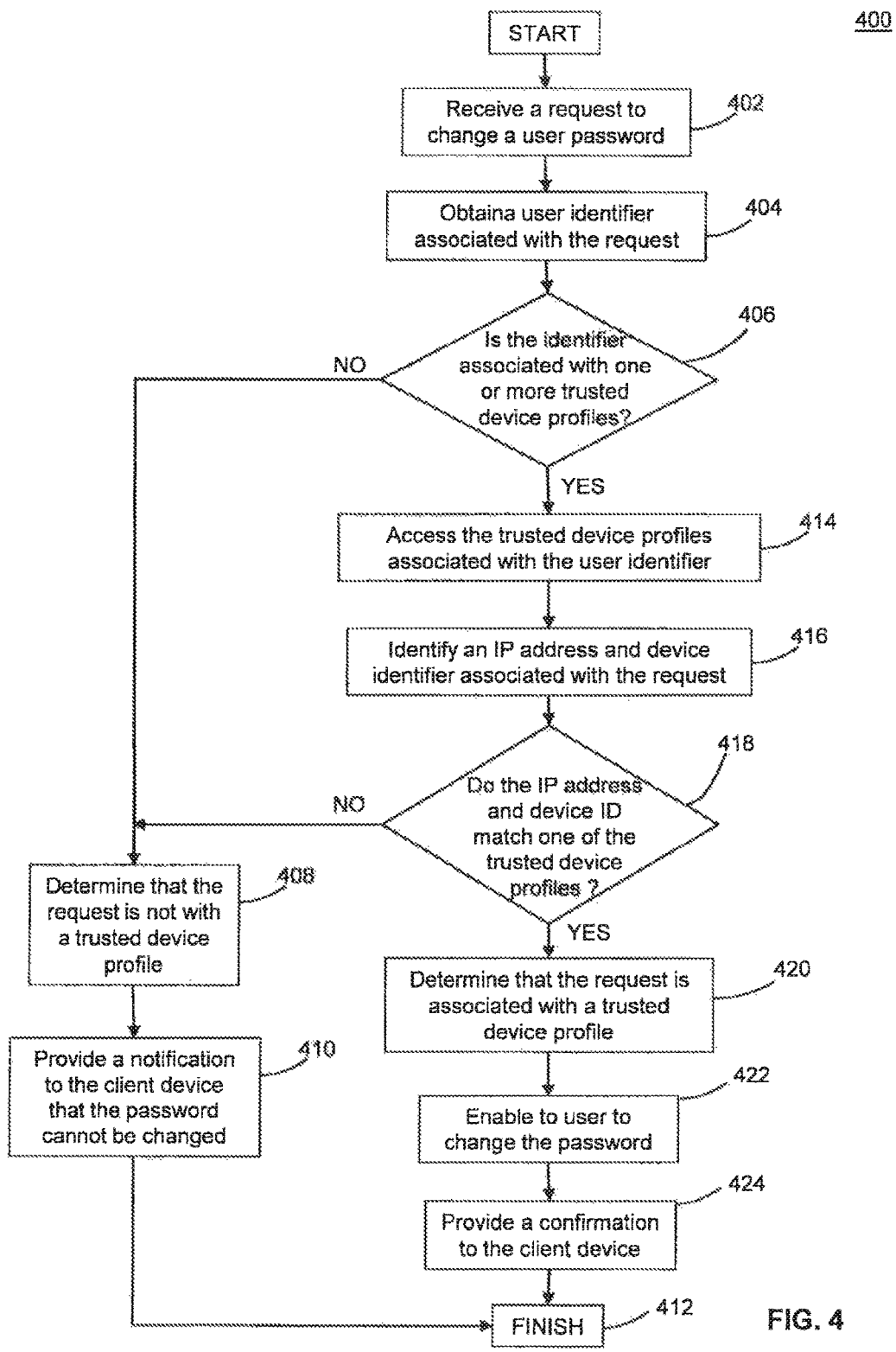
FIG. 4 is a flowchart of an exemplary method that enables a user to modify a login credential based on a trusted device profile, consistent with embodiments of the present disclosure.

FIG. 4 is a flowchart of an exemplary method 400 that enables a user of a client device to modify a login credential in accordance with a trust level associated with the client device, in accordance with embodiments consistent with the present disclosure. In an embodiment, method 400 may enable device profiling server 142 to determine a level of trust associated with a client device (e.g., client device 102) based on a corresponding device profile, and to subsequently enable the user to seamlessly change a password based on the determined trust level.

In step 402, device profiling server 142 may receive a request to change a password from a web server (e.g., web server 122). In an embodiment, the request may be generated by web server 122 in response to the user's selection of a corresponding region within a web page or other graphical user interface displayed on a client device (e.g. client device 102 of FIG. 1), and may be transmitted to display profiling system 140 over communications network 130 using one or more of the communications protocols outlined above.

Figure 5A:
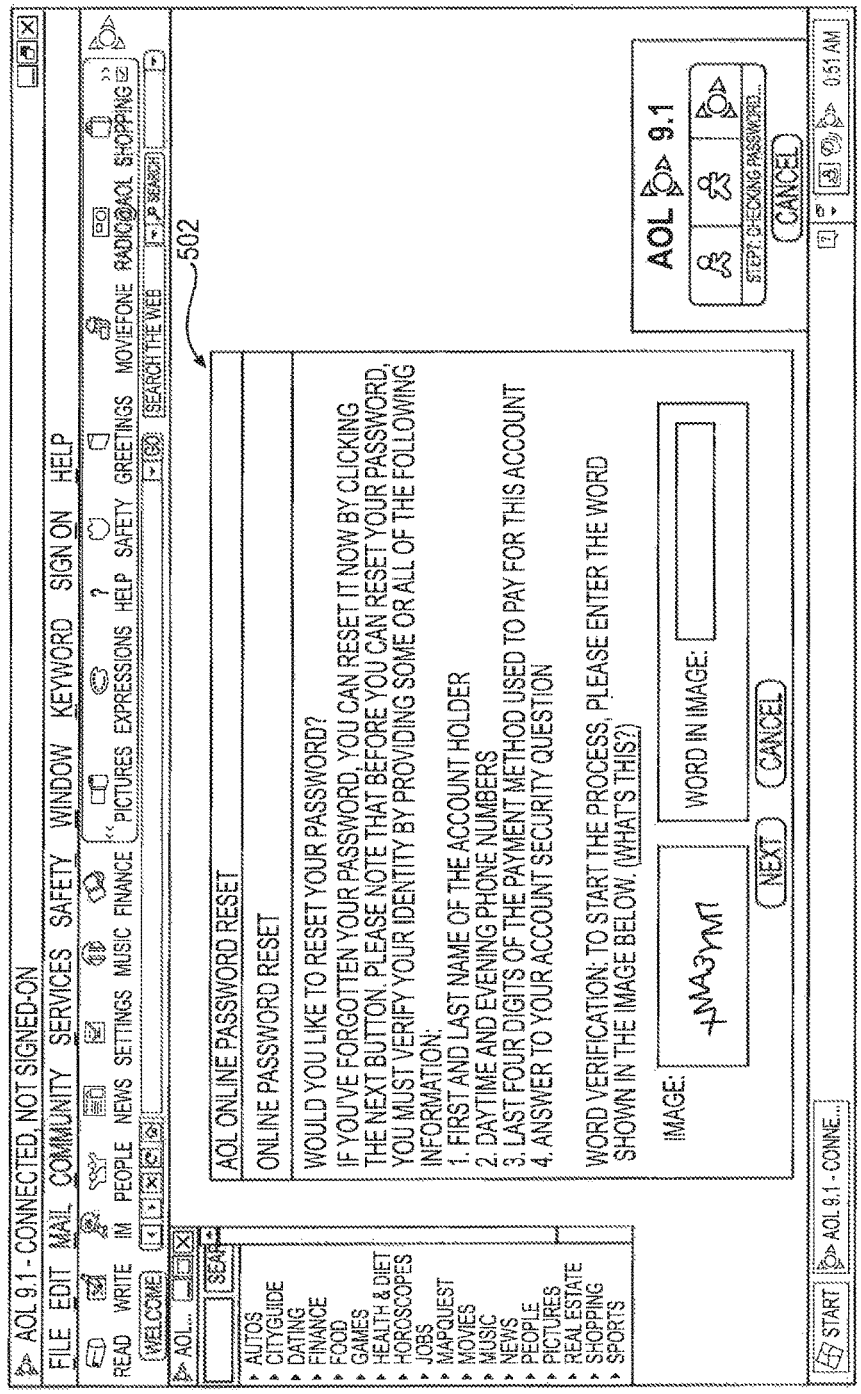
FIGS. 5A-5D illustrate exemplary interfaces provided to a user by a device profiling system, consistent with embodiments of the present disclosure.

In an embodiment, and in response to the request, device profiling server 142 may require the user to submit an additional element of authentication information. For example, as depicted in FIG. 5A, device profiling server 142, in conjunction with web server 122, may generate an interface 502 that requires the user to satisfy a challenge-response test, such as a CAPTCHA or check box, before determining a level of trust associated with the user and the client device. In such embodiments, the use of a challenge-response test reduces a potential for quality-of-service attacks carried out by hackers or other malicious entities.

Referring back to FIG. 4, device profiling server 142 may subsequently identify a user associated with the request in step 404. For example, device profiling server 142 may process the received request to extract a user identifier (e.g., screen name 302 of FIG. 3) from the received request. Once extracted from the request, device profiling server 142 may determine whether the user identifier is associated with one or more trusted device profiles in step 406. For example, device profiling server 142 may determine whether the user identifier corresponds to an entry within the user data 144A or database 144. If the user identifier is not associated with an entry in user data 144A, then device profiling server 142 determines that the request is not associated with a trusted device profile in step 408.

If the user identifier is associated with an entry in user data 144A, then the user associated with the request is deemed a registered user. Device profiling server 142 subsequently determines whether the registered user is associated with one or more of the trusted device profiles. If it is determined in step 406 that the registered user is not associated with a trusted device profile, then method 400 passes to step 408, and device profiling server 142 determines that the request is not associated with a corresponding trusted device profile.

Figure 5B:
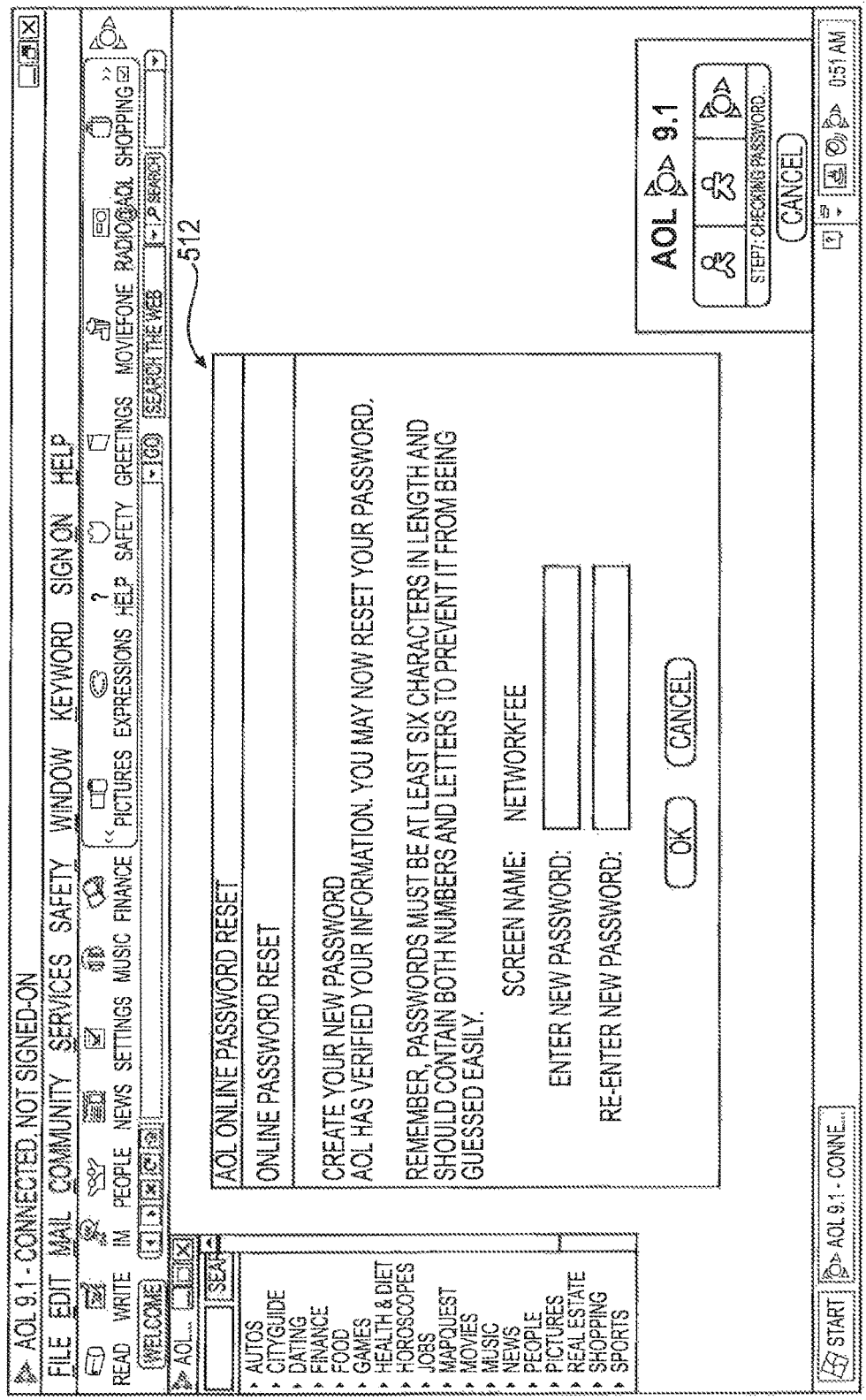
Figure 5C:
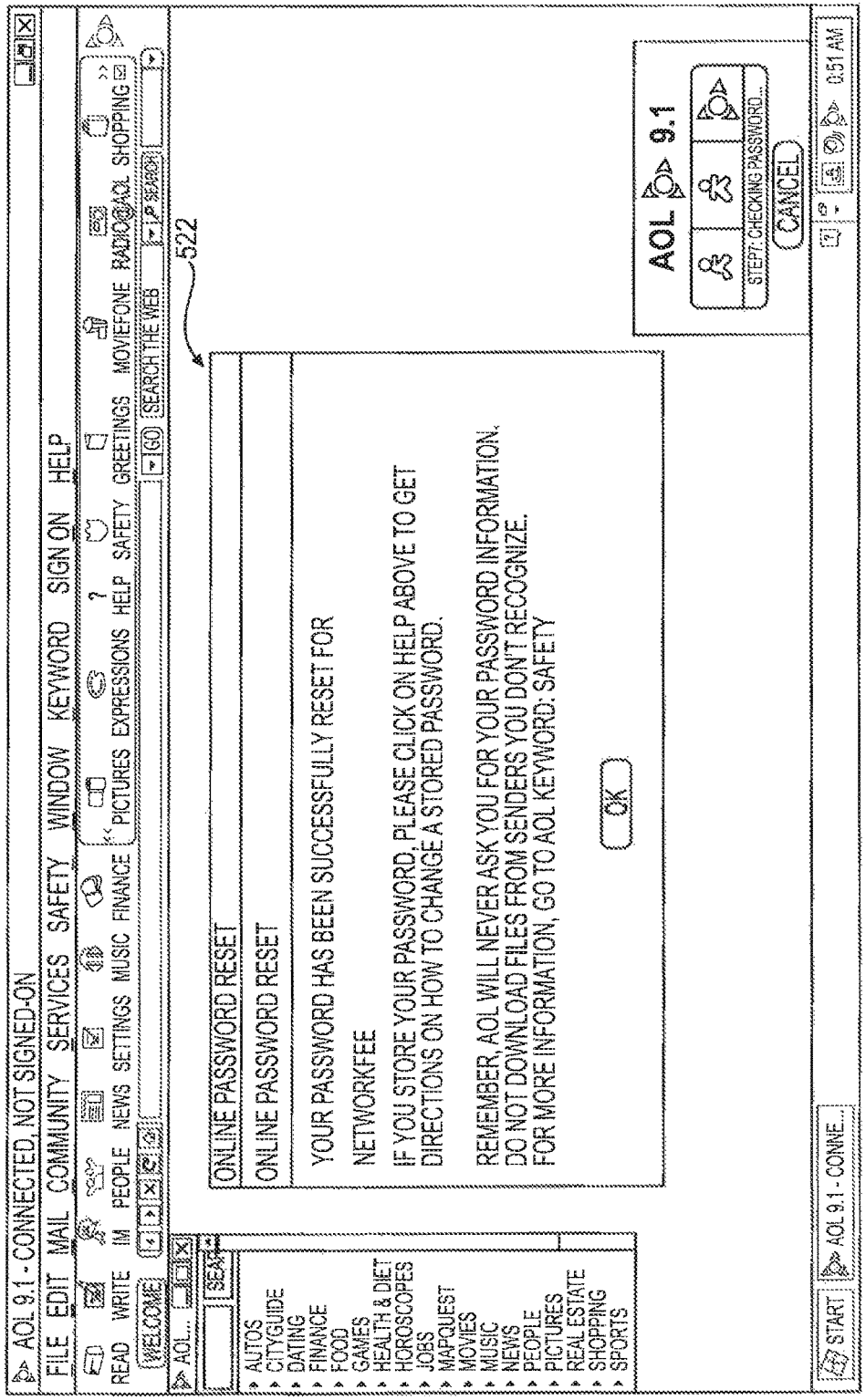
Figure 5D:
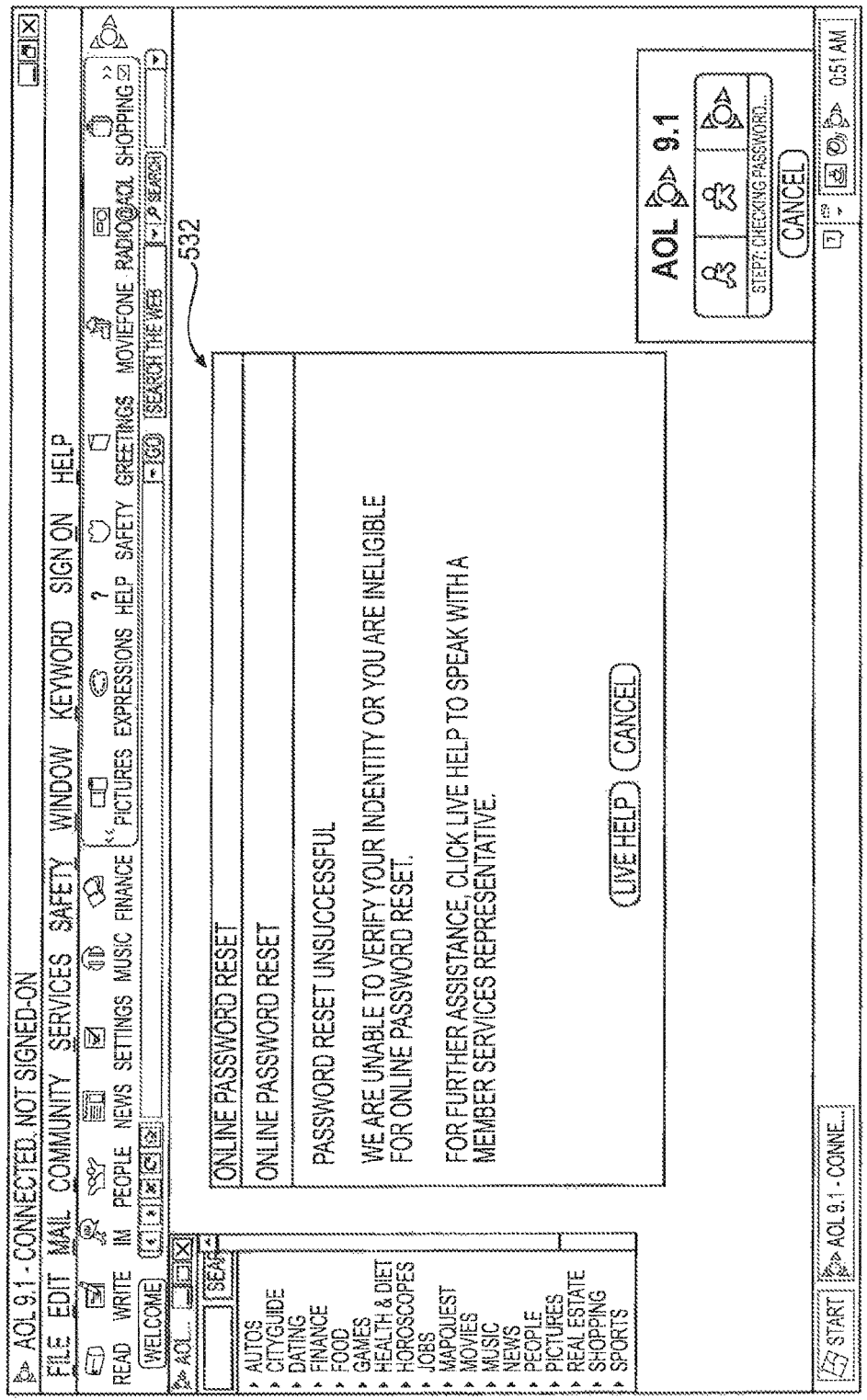

In step 410, and upon determination that the request is not associated with a trusted device profile, device profiling server 142 may generate a notification that to the user that the password cannot be changed. The notification may be subsequently transmitted across network 130 to web server 122, and the client device may display the notification to the user through a web browser or other graphical user interface. FIG. 5D illustrates an exemplary notification 532 that indicates to the user that a level of trust associated with the client device is insufficient to reset the user's password. Method 400 is subsequently completed in step 412.

In additional embodiments, upon transmission of the notification in step 410, the user of the client device may be presented with one or more additional options for changing the password. For example, the user may be presented with a number of additional security questions designed to verify the user's identity and intentions. Furthermore, the user may be prompted to contact a call center or other help line associated with web server 122 to speak with a customer representative. In an embodiment, given the failure of the initial request, the user's contact of the call center may be performed without additional charge.

Referring back to FIG. 4, if it is determined in step 406 that the registered user is associated with one or more trusted device profiles, then device profiling server 142 accesses the identified trusted device profiles in step 414. Device profiling server 142 subsequently obtains an IP address and device identifier associated with the received request in step 416, and compares the obtained IP address and device identifier against the identified trusted device profiles in step 418.

In an embodiment, device profiling server 142 may process the received request to extract from the request the IP address associated with the request and the device identifier associated with the client device. As described above, the device identifier may include, but is not limited to, a unique numerical value assigned to client device 102 (e.g., by device profiling server 142), an application serial number (ASN) associated with software installed on client device 102, and a serial number associated with a Java toolbar or similar plug-in executed by a web browser. In such embodiments, the device identifier may be automatically included in or appended to the request to change the password by one or more software programs executed by the client device, e.g., one or more cookies.

For example, the device identifier may be maintained at the client device by a combination of a browser cookie and a flash cookie. In such an embodiment, the device identifier may be represented by a unique numerical value assigned to the flash and browser cookies by device profiling server 142, and the browser cookie may be configured to transmit the device identifier to device profiling server 142 in response to or concurrently with the request.

Furthermore, the user of the client device may periodically delete the browser cookie, for example, to free space on a hard drive or to increase an efficiency of a web browser. In such an embodiment, and upon deletion of the browser cookie, the flash cookie may generate an additional copy of the browser cookie and to provide the browser cookie with the device identifier defined by device profiling server 142.

Additionally, a dedicated user may delete both the browser cookie and the flash cookie. In such an instance, device profiling server 142 may determine that the request for the password change received from the client device does not include the device identifier. In response to such a determination, device profiling server 142 may transmit an additional copy of the flash cookie to the client device with a newly-defined numerical value serving as the device identifier. Upon execution of the flash cookie by the client device, the browser cookie may be generated with the corresponding value of the new device identifier.

The disclosed embodiments are not limited to such exemplary mechanisms for maintaining device identifiers, and in additional embodiments, device profiling server 142 may obtain a unique device identifier based on one or more applications installed and executing on the client device. For example, upon installation of an application, the client device may store a copy of a serial number of the application (i.e., a value of an ASN), and which may be automatically included within the request to change the password by the web browser or graphical user interface.

Additionally or alternatively, the web browser may include one or more toolbars downloaded by the user and associated with corresponding serial numbers. In such an embodiment, and in response to a user action, the web browser may issue an appropriate application call (e.g., a Java call) that instructs the toolbar to provide the corresponding serial number. As described above, the toolbar serial number may be automatically included within the request to change the password by the web browser or graphical user interface.

Referring back to FIG. 4, device profiling server 142 may match the identified IP address and device identifier with corresponding information specified by the accessed trusted device profiles in step 418. If device profiling server 142 does not identify a trusted device profile that corresponds to the identified IP address and device identifier in step 418, then method 400 passes back to step 408. As discussed above, in step 408, device profiling server 142 determines that the request is not associated with a trusted device profile, and subsequently generates a notification that the user that the password cannot be changed in step 410. Method 400 is then complete in step 412.

If, however, device profiling server 142 determines that one of the trusted device profiles corresponds to the Identified IP address and device identifier, then device profiling server 142 determines that the request is associated with the trusted device profile in step 420, and enables the user to change the password in step 422. In such an embodiment, device profiling server 142 may coordinate with web server 122 to provide the user with an interface to enter and confirm a new password, which may be displayed to the user by a web browser executing at the client device. For example, FIG. 5B illustrates an exemplary interface 512 through which the user may enter a new password and subsequently confirm entry.

In step 424, device profiling server 142 may generate a confirmation of a successful change in the password, which may be subsequently transmitted to web server 122 and displayed within a web browser executing at the client device. For example, FIG. 5G illustrates an exemplary notification 522 that may be generated by device profiling server 142. Method 400 is subsequently complete in step 412.

In the embodiments described above, a user may leverage a "trusted" device (e.g., one of client devices 102 and 112) to modify a password seamlessly without providing case-specific answers to cumbersome security questions and challenges. The determination of whether a client device is "trusted" by device profiling server 142 depends upon a status of a device profile corresponding to the client device and the user. In such an embodiment, the device profiles may be generated by device profiling server 142 based upon an analysis of the user's prior access to computing environment 100, as described below with reference to FIG. 6.

Figure 6:
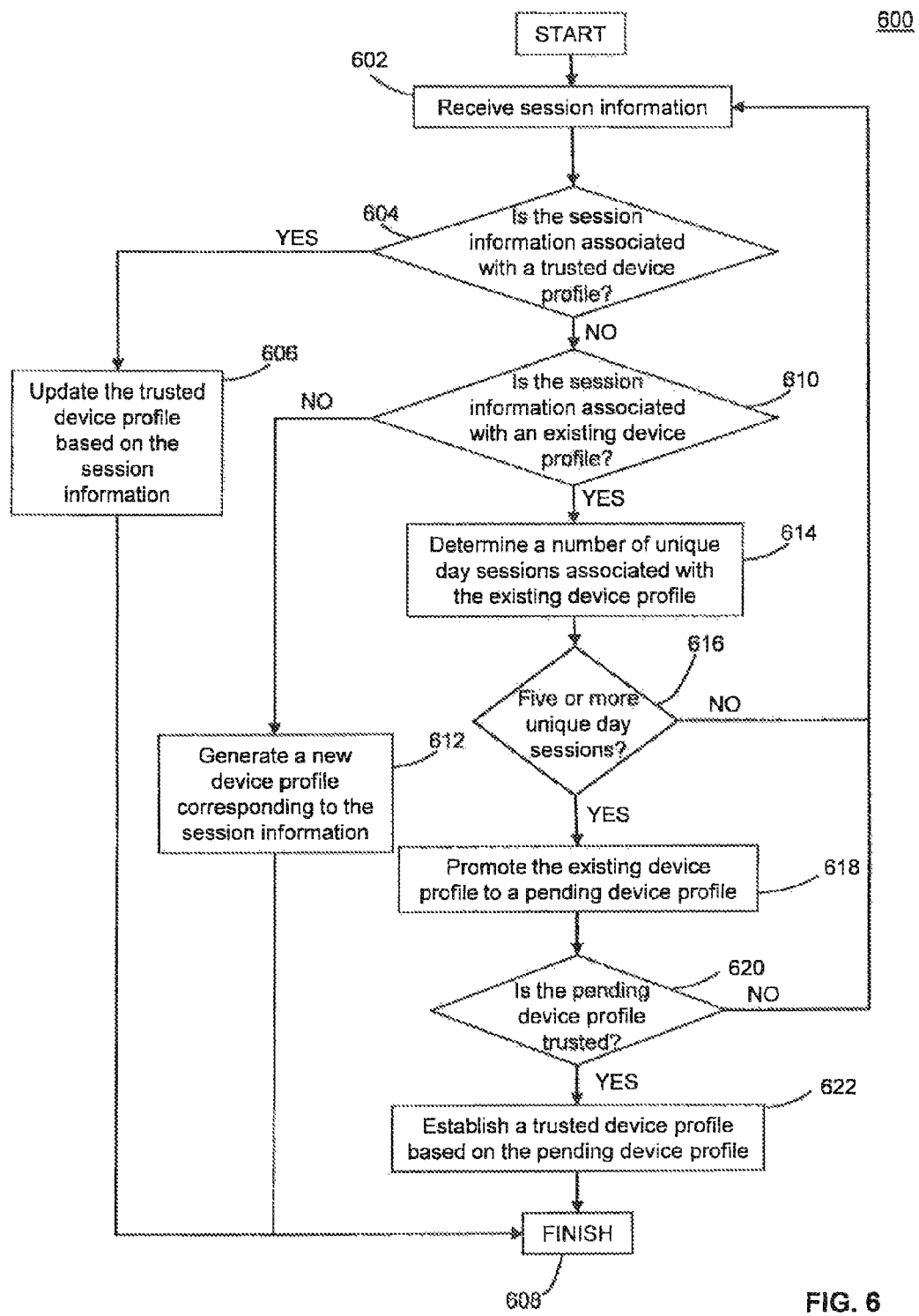
FIG. 6 is a flowchart of an exemplary method for generating and updating device profiles, consistent with embodiments of the present disclosure.

FIG. 6 is a flow chart of an exemplary method 600 for generating and updating device profiles, according to an embodiment consistent with the present disclosure. Method 600 may enable a device profiling server (e.g., device profiling server 142 of FIG. 1) to generate new device profiles corresponding to new users and/or new devices, to modify a status of an existing device session, and to identify and generate one or more trusted device profiles in response to a user's access history.

In FIG. 6, device profiling server 142 receives session information in step 602. In an embodiment, such session information may include, but is not limited to, a user identifier, a device identifier of a client device, communications session time stamps (e.g., session start and end times), and certain actions taken during the communications session. Further, in such embodiments, device profiling server 142 may monitor network traffic and access the session information in real time (e.g., in response to an initiation of a session between client device 102 and web browser 122), and additionally or alternatively, may obtain the session information from session logs provided to device profiling server 142 at regular intervals (e.g., daily).

In step 604, device profiling server 142 accesses profile data 144B and determines whether the received session information corresponds to a trusted device profile. For example, device profiling server 142 may extract a user identifier, corresponding device identifier, and IP address from the session information, and may compare the at least a portion of the extracted data against the trusted device profiles to identify a matching profile. If device profiling server 142 determines in step 604 that a trusted device profile matches the received session information, device profiling server 142 may update the trusted device profile to account for the session information in step 606. For example, device profiling server 142 may update a counter indicative of a number of day sessions associated with the extracted IP address, and may determine whether the extracted IP address corresponds to a trusted IP address, as described below with reference to FIG. 8. Method 600 is subsequently completed in step 608.

If, however, device profiling server 142 determines in step 604 that no trusted device profiles match the received session information, then device profiling server 142 determines whether any existing device profile matches the received session information. If device profiling server 142 determines that no existing device profiles correspond to the received session information, then a new device profile corresponding to the received session information is generated by device profiling server 142 in step 612. For example, the new device profile may specify the extracted device identifier, may specify the extracted user identifier, and may include information indicating that the new device profile is associated with a single unique day session, as defined above. In such embodiments, the new device profile may be stored within profile data 144B of FIG. 1.

Figure 7A:
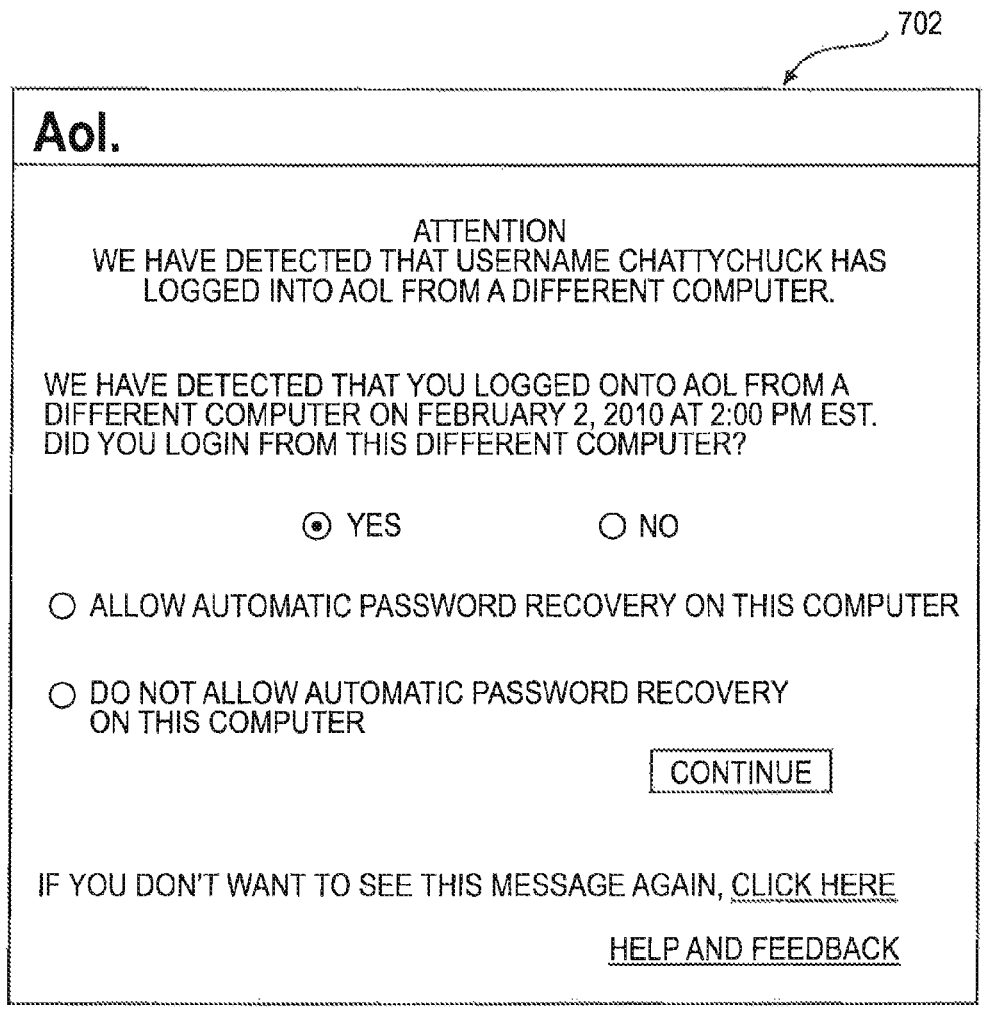
FIGS. 7A-7C illustrate exemplary "pop-up" ads provided to a user by a device profiling system, consistent with embodiments of the present disclosure.

In addition, in step 612 and upon generation of the new device profile, device profiling server 142 may determine a number of new device profiles generated during a current calendar day. If new device profile number exceeds a threshold value (e.g., three new device profiles per day), device profiling server 142 deletes from profile data 144B those new device profiles generated during the current calendar day Further, device profiling server 142 may generate and transmit a warning to web server 122, which may be displayed to the user through a web browser executing on client device. FIG. 7A illustrates an exemplary warning 702, which may be displayed to the user as a "pop-up" upon determination that the daily threshold number of new device profiles has been exceeded.

Referring back to FIG. 6, if device profiling server 142 identifies an existing device profile that correspond to the received session information, the existing device profile may be accessed by in step 614, and device profiling server 142 may determine a number of unique day sessions associated with the existing device profile.

Device profiling server 142 subsequently determines in step 616 whether the existing device profile is associated with at least a threshold number of unique day sessions. For example, the threshold number of unique date session may include, but is not limited to, five or more unique day sessions. If the existing device profile fails exceed the threshold number, then device profiling server 142 may update the number of unique day sessions to account for the received session information, and method 600 passes back to step 602 to await additional session information.

Figure 7B:
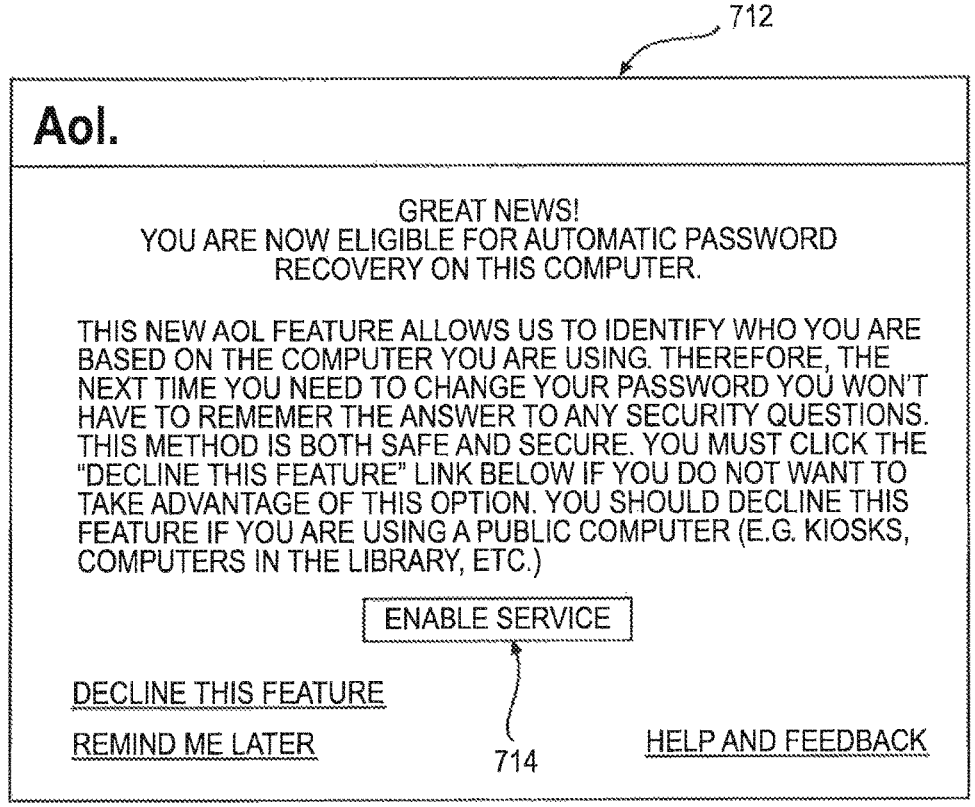

If, however, the number of unique day sessions associated with existing device profile exceeds the threshold value, the device profiling server 142 may change the status of the existing device profile to "pending" In step 618. In such an embodiment, device profiling server 142 "promotes" the existing device session to a pending device session, thereby triggering the generation of a message that notifies the user of the change in status. The message may be transmitted to web server 122, and the message may be subsequently displayed to the user through a web browser of graphical user interface executed by the client device. FIG. 7B illustrates an exemplary "attention" message 712, which may be displayed as a "pop-up" to the user in response to the change in status of the existing device profile.

Figure 7C:
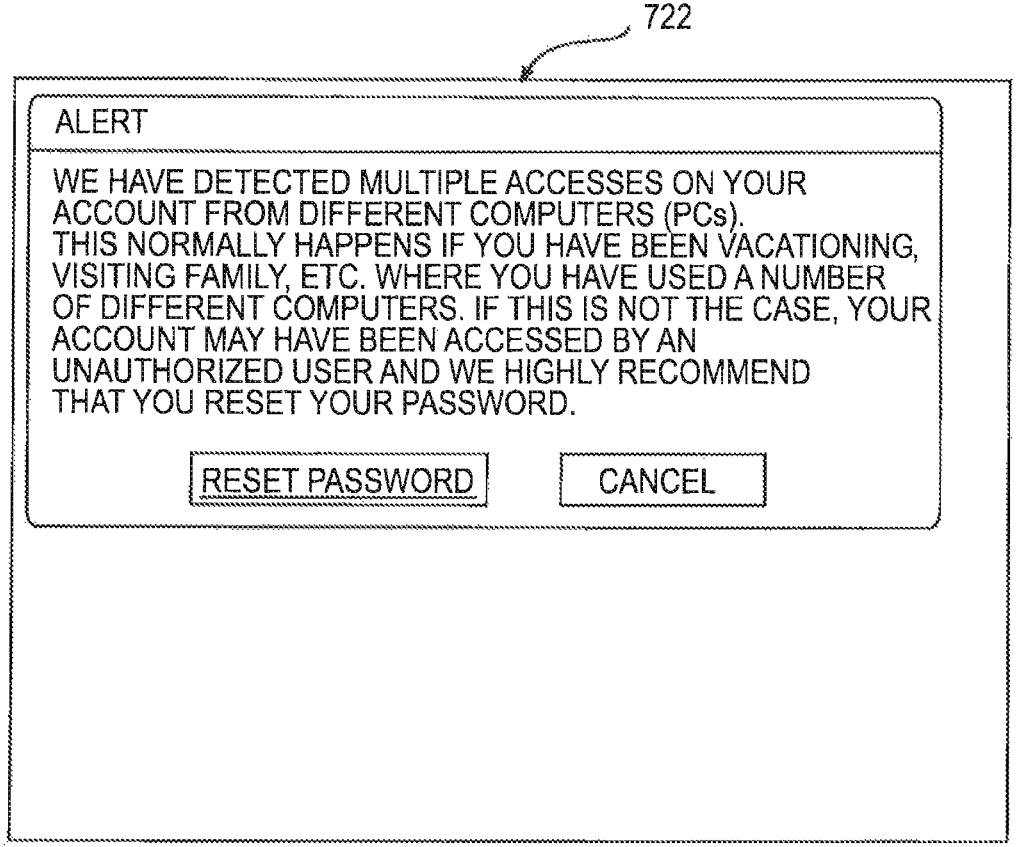

In addition, in step 618 and upon promotion of the existing device profile, device profiling server 142 may determine a number of pending device profiles established during a current calendar day. If the determined number exceeds a threshold value (e.g., two pending device profiles per day), device profiling server 142 deletes from profile data 144B those pending device profiles established during the current calendar day Further, device profiling server 142 may generate and transmit a warning to web server 122, which may be displayed to the user through a web browser executing on the client device. FIG. 7C illustrates an exemplary warning 722, which may be displayed to the user as a "pop-up" upon determination that the daily threshold number of new device profiles has been exceeded.

In step 620, device profiling server 142 determines whether the pending device profile associated with the received session information should be trusted, and as such, should be treated as a trusted device profile. In such an embodiment, the determination in step 620 may in occur in accordance with one or more "trust" rules that include, but are not limited to, an "opt-in" rule, and authentication rule, and a "just registered" rule.

For example, device profiling server 142 may apply an "opt-in" rule to determine whether the pending device profile should be trusted in step 620. As described above with reference to step 618, device profiling server 142 may generate and transmit an attention message that notifies the user of a promotion an existing device profile to a pending device profile. In such an embodiment, the attention message, e.g., attention message 712 of FIG. 7B, may enable to user to "opt-in" to the change in service. For example, in FIG. 7B, the user may click on or otherwise activate region 714 of the displayed message to "enable service," and as such, "opt-in" to the change in service.

Upon selection of region 714, a corresponding response may be transmitted over communications network 130 to device profiling server 142, and upon receipt of the response, device profiling server 142 may determine that user has accepted the change of status, and as such, has "opted-in." In such an embodiment, device profiling server 142 may determine in step 620 that the pending device profile accepted by the user is now associated with a trusted status.

As noted above, a user identifier may be associated with up to a threshold number of trusted device profiles within profile data 144B. In such an embodiment, when the user "opts-in" to the promotion of a pending device profile to trusted status, device profiling server 142 may delete each of the other trusted device profiles associated with the user identifier. For example, a user may have trusted device profiles corresponding to a place of work and a relative's home. Upon promotion of a pending device profile associated with the user's home to trusted status, device profiling server 142 may delete the trusted device profiles associated with the place of work and the relative's home from profile data 144B. Additionally, in an embodiment, the opt-in rule may be applied by device profiling server 142 only when a pair of user and device identifiers is associated with at least one trusted device profile.

Further, if the user were to "opt-out" of the promotion, the pending device profile of the user may be deleted from profile data 144B. In such embodiments, the user's decision to opt-out of the promotion may be effective immediately, and device profiling server 142 may delete the pending profile of the user any other profiles associated with the user identifier from profile data 144B.

The determination in step 620 is not limited to such exemplary "opt-in" rules, and in additional embodiments, an authentication rule may be leveraged by device profiling server 142 to determine whether to trust the pending device profile. For example, device profiling server 142 may identify the pending device profile as trusted in step 620 when associated with at least ten unique day sessions within at least twenty consecutive calendar days. The threshold number of day sessions and the minimum time period associated with such an authentication rule are not limited to such exemplary values, and in additional embodiments, device profiling server 142 may apply an authentication rule requiring any additional or alternate number of day sessions, and any additional or alternate minimum time period, without departing from the spirit or scope of the disclosed embodiments.

In additional embodiments, device profiling server 142 may leverage a "just registered" rule in step 620 to determine whether the pending device profile is a trusted device profile. For example, the user of the client device may log into web server 122 within a specified time period (e.g., within one hour) of a time stamp associated with a session of a just-registered user (i.e., a "just-registered" session), and a pending device profile associated with the client device and the user may be deemed to be trusted by device profiling server 142 in step 620. In such an embodiment, the just-registered session may represent a session for which session parameters (e.g., an IP address, session time stamps, and session activities) are registered for purposes of counting unique day sessions The disclosed embodiments are, however, not limited to such exemplary rules. In further embodiments, device profiling server 142 may use any additional or alternate rule, or any combination of rules, to determine whether a pending device profile is trusted, without departing from the spirit or scope of the pending embodiments.

Referring back to FIG. 6, if device profiling server 142 does not trust the pending device profile, the method 600 passes back to step 602, and device profiling server 142 awaits additional session information. Alternatively, if device profiling server 142 determines that the pending device profile is trusted, then a trusted device profile based on the pending device profile is established by device profiling server 142 in step 622. Method 600 is subsequently completed in step 608.

In the embodiments described above, a user of a client device may approve a conversion of a pending device profile into a trusted device profile (e.g., through a "pop-up" ad), thereby "opting-in" to the enhanced authentication services provided by device profiling server 142. In such embodiments, device profile server 142 may also provide the user with an opportunity to "opt-out" of the enhanced authentication services at any time after approval of the conversion. For example, the user may "opt-out" of the enhanced authentication services through a corresponding "pop-up" ad, or alternatively, by transmitting a request to device profiling server 142 over communications network 130.

Furthermore, in an embodiment, device profiling server 142 may be in communication with one or more support servers associated with a user support service (e.g., a telephone call center or help line providing support to one or more users of the enhanced authentication services). For example, a user associated with a trusted device profile may contact the call center by telephone, and may "opt-out" of the enhanced authentication services by supplying a corresponding set of authentication credentials (e.g., a user identifier) to an operator. In such embodiments, and upon confirmation of the request, device profiling server 142 may immediate delete the trusted device profile and any additional or alternate device profile associated with the supplied credentials from profile data 144B. Additionally, in such embodiments, a user associated with a pending device profile may contact the user support service by telephone, and may supply a corresponding set of authentication credentials to convert the pending device profile into a trusted profile, thereby "opting-in" to the enhanced authentication services provided by device profiling server 142.

Using the exemplary methods of FIG. 6, device profiling server 142 may generate new device profiles corresponding to new users and/or new devices, to modify a status of an existing device session, and to identify and generate one or more trusted device profiles in response to a user's access history. In additional embodiments, the device profiling server 142 may further update information associated with an existing trusted device profile to account for activity by a user associated with the trusted device profile, as described below with reference to FIG. 8.

Figure 8:
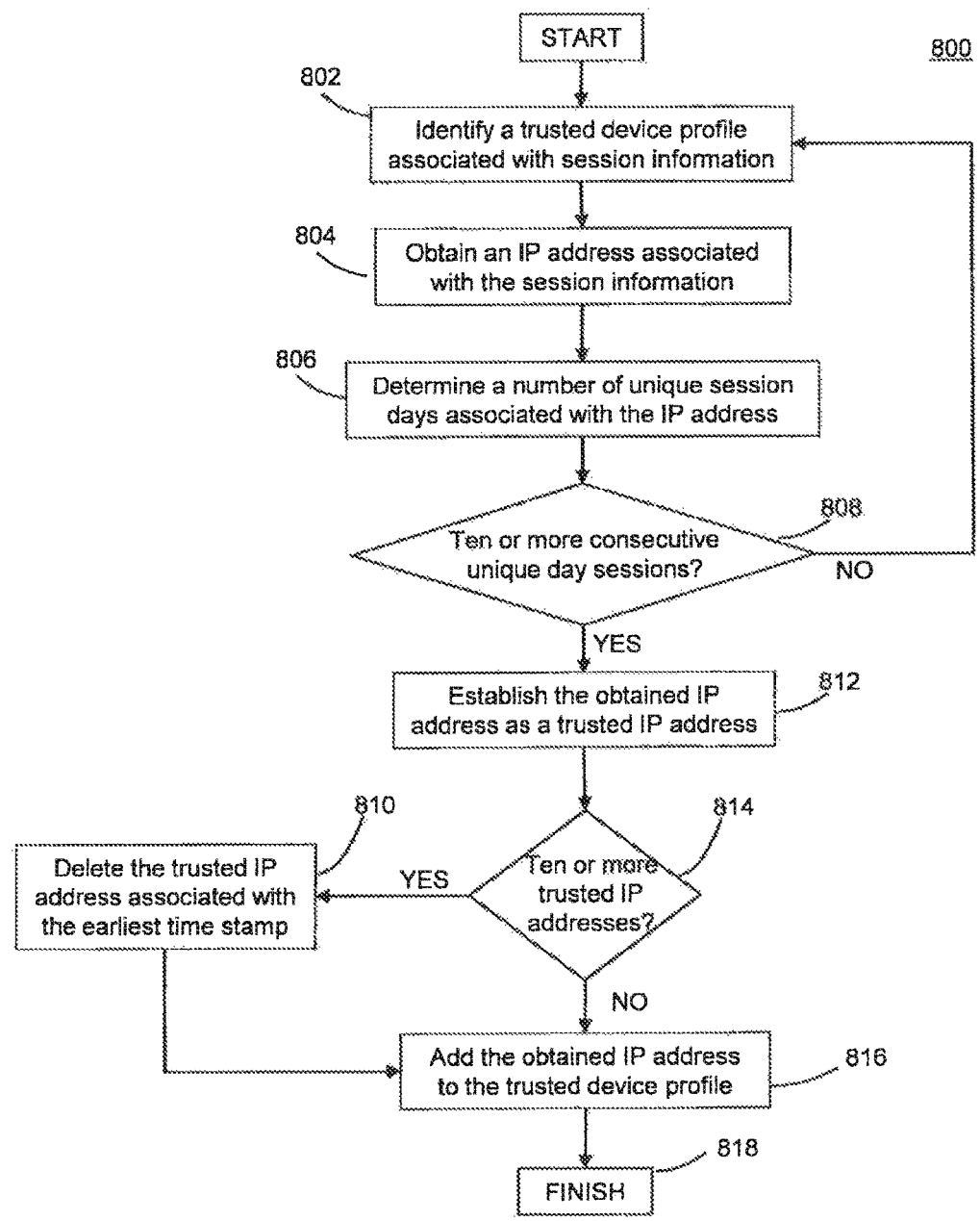
FIG. 8 is a flowchart of an exemplary method for updating information associated with a trusted device profile, consistent with embodiments of the present disclosure.

FIG. 8 is an exemplary method 800 for updating information associated with a trusted device profile, in accordance with an embodiment consistent with the present disclosure. Method 800 may enable a device profiling server (e.g., device profiling server 142 of FIG. 1) to update and filter one or more trusted IP addresses associated with the trusted device profile.

In step 802, device profiling server 142 identifies a trusted device profile corresponding to session information associated with a user and a client device (e.g., client device 102 of FIG. 1). For example, and as described above with reference to FIG. 6, device profiling server 142 may receive the session information, and may subsequently extract a user identifier and corresponding device identifier from the received session information. In such an embodiment, device profiling server 142 may leverage the extracted user and device identifiers to identify the trusted device profile.

In step 804, device profiling server 142 may obtain an IP address associated with the session information and/or the trusted device profile. For example, as described above with reference to FIG. 6, device profiling server 142 may process the received session information to extract the IP address. Further, for example, device profiling server 142 may select one of the IP addresses associated with the trusted device profile that has not yet been accorded trusted status.

In step 806, device profiling server 142 may subsequently identify a number of unique and consecutive day sessions associated with the obtained IP address. For example, a unique day session refers to a calendar day during which a session associated with the IP address was registered and logged by device profiling server 142.

In step 808, device profiling server 142 determines whether the number of day sessions exceeds a threshold number of consecutive day sessions. For example, the threshold number of consecutive day sessions may corresponding to ten consecutive day sessions or any additional or alternate number of consecutive day sessions appropriate to a level of trust necessary to authenticate the user and the client device. It the identified number of consecutive day sessions fails to exceed the threshold number, then method 800 passes back to step 802, and device profiling server 800 identifies an additional trusted device profile.

If, however, the Identified number of consecutive day sessions exceeds the threshold number, then device profiling server 142 establishes the obtained IP address as a trusted IP address for the trusted device profile in step 810. Device profiling server 142 then determines in step 812 whether the trusted device profile is associated with a threshold number of trusted IP addresses (e.g., ten trusted IP addresses).

In such embodiments, the trusted IP addresses may be associated with time stamps indicative of the last registered sessions involving the trusted IP addresses. If the trusted device profile is associated with the threshold number of trusted IP addresses, then device profiling server 142 may delete the trusted IP address having the earliest time stamp from the trusted device profile in step 814. Alternatively, if the trusted device profile does not include the threshold number of trusted IP addresses, then device profiling server 142 may add the trusted IP address, which was established in step 810, to the trusted device profile in step 816. The method is subsequently completed in step 818.

In the embodiments described above, device profiling server 142 generates and manages device profile data in response to information obtained from on one or more communications session involving a user and a corresponding client device (e.g., client device 102 and 112 of FIG. 1). In these embodiments, such exemplary processes may be performed by device profiling server 142 in real time upon receipt of corresponding session data, or alternatively, at regular intervals in response to received session logs. Furthermore, as device profiling server 142 provides users access to corresponding trusted profiles, a web service associated with device profiling server 142 (e.g., operating on a corresponding web server) may provide enhanced authentication services directly to the users in accordance with the accessed trusted device profiles. In such embodiments, device profile server 142 need not access profile data 144B in response to each user request for an enhanced authentication service, thereby increasing a speed and an efficiency at which such services are provided to the users.

In further embodiments, device profiling server 142 may process stored device profiles within profile data 144B to identify and filter dormant profiles. For example, device profiling server 142 may identify a pending device profile within profile data 144B as being a dormant profile when no session involving the pending device profile has been registered for five days, and additionally or alternatively, the pending device profile has been associated with no activity for at least five days. Furthermore, after 180 days in dormant state, device profiling server 142 may delete a dormant device profile from profile data 144B. The disclosed embodiments are, however, not limited to such exemplary time periods and durations, and in additional embodiments, the Identification and filtering of dormant device profiles may be based on any additional or alternate time period.

Further, in an embodiment, device profiling server 142 may also monitor and filter the device profiles stored in profile data 144B. For example, a single user may be associated with only a specified total number of device profiles in profile data 144B, or alternatively, the single user may be associated with threshold numbers of new, pending, and trusted device profiles. In such embodiments, if the number of device profiles exceeds a corresponding threshold value, device profiling server 142 may filter out and delete the device profile having an earliest time stamp (i.e., the most dormant device profile).

Further, as discussed above, client devices 102 and 112 may be characterized by device identifiers that include, but are not limited to, random numbers assigned by device profiling server 142 and maintained in corresponding flash and browser cookies, application serials numbers of installed applications, and serial numbers associated with Java toolbars. Thus, as the single client device may be associated with multiple identifiers, profile data 144B may include multiple device profiles of a common status (i.e., new, pending, or trusted). In such embodiments, device profiling server 142 may identify the multiple device profiles and merge them into a single device profile associated with a single user identifier and single device identifier.

Further, in the embodiments described above, various "pop-up" ads are delivered to a user by device profiling server 142. In an embodiment, the delivery of such "pop-up" ads may occur at regular intervals (e.g., five-minute intervals) or may occur during specified times. Furthermore, as many users may configure web browsers to block "pop-up" ads, the content of these ads may be delivered in any additional or alternate format appropriate to such web browsers.

In the embodiments described above, trusted device profiles are leveraged by device profiling server 142 to seamlessly enable a user to change a password associated with web server 122. The disclosed embodiments are not limited to such exemplary applications, and in additional embodiments, device profiling server 142 may leverage the trusted device profiles of profile data 144B to enable a user to access one or more functions of web server 122 from a trusted device without entry of corresponding login credentials.

Further, as described above, a user may be associated with up to ten trusted device profiles. In such embodiments, device profiling server 142 may enable a user, through an appropriate interface, to assign names or other identifying information to each of the trusted device profiles. For example, the user may identify one trusted device profile as "home," and a second trusted device profile as "work."

Additionally, the trusted device profiles outlined above may be leveraged to reduce the frequency of attacks by hackers and to reduce the damage inflicted by such attacks. For example, and as discussed above, the trusted IP addresses associated with a trusted device profile may be filtered against a "black list" of IP addresses associated with known hackers, or with regions that harbor known hackers, to reduce the frequency and data associated with such attacks.

The embodiments described above relate to a single client device, e.g., client device 102. Embodiments consistent with the present disclosure are not limited to interaction with client device 102. For example, in additional embodiments, the disclosed processes may leverage client device 1212, or any additional or alternate device capable of communications protocol processing.

Various embodiments have been described herein with reference to the accompanying drawings. It will, however, be evident that various modifications and changes may be made thereto, and additional embodiments may be implemented, without departing from the broader scope of the present disclosure.

Further, other embodiments will be apparent to those skilled in the art from consideration of the specification and practice of one or more embodiments disclosed herein. It is intended, therefore, that this disclosure and the examples herein be considered as exemplary only, with a true scope and spirit of the invention being indicated by the following listing of exemplary claims.

What is claimed is:

1. A computer-implemented method comprising the following operations performed by at least one processor:
   obtaining a trusted device profile associated with a user, the trusted device profile comprising a trusted Internet Protocol address associated with a device of the user;
   identifying an Internet Protocol address associated with a request to access a function of a web server, the request being received from the device of the user;
   determining whether the identified Internet Protocol address is associated with the trusted device profile;
   determining whether a number of day sessions associated with the identified Internet Protocol address exceeds a first threshold value, when the identified Internet Protocol address is not associated with the trusted device profile; and
   establishing the Internet Protocol address as a trusted Internet Protocol address, when the number of day sessions is determined to exceed the first threshold value.

2. The computer-implemented method of claim 1, further comprising the following operations performed by the processor:
   updating the trusted device profile to include the established trusted Internet Protocol address.

3. The computer-implemented method of claim 1, further comprising the following operations performed by the processor:
   determining whether a number of trusted Internet Protocol addresses associated with the trusted device profile exceeds a second threshold value; and
   storing the established Internet Protocol address in the trusted device profile when the number of trusted Internet Protocol addresses is determined not to exceed the second threshold value.

4. The computer-implemented method of claim 1, further comprising the following operations performed by the processor:
   determining whether a number of trusted Internet Protocol addresses associated with the trusted device profile exceeds a second threshold value;

removing a trusted Internet Protocol address associated with the trusted device profile when the number of trusted Internet Protocol addresses is determined to exceed the second threshold value; and storing the established Internet Protocol address in the trusted device profile.

5. The computer-implemented method of claim 4, wherein:

each trusted Internet Protocol address is associated with a time stamp; and removing the trusted Internet Protocol address further comprises removing the trusted Internet Protocol address associated with the earliest time stamp.

6. The computer-implemented method of claim 1, wherein:

the request is associated with session information, the session information comprising at least one of a first identifier associated with the user and a second identifier associated with the user device.

7. The computer-implemented method of claim 6, further comprising the following operations performed by the processor:

determining whether the session information corresponds to at least one of an existing device profile or a pending device profile, when the request fails to be associated with a trusted device profile.

8. The computer-implemented method of claim 7, further comprising the following operations performed by the processor:

when the session information corresponds to the existing device profile, identifying a number of day sessions associated with the existing device profile;

determining whether the identified number of day sessions exceeds a threshold value; and establishing the existing device profile as a pending device profile, when the number of day sessions exceeds the threshold value.

9. The computer-implemented method of claim 7, further comprising the following operations performed by the processor:

when the session information corresponds to the pending device profile, determining whether the pending device profile is associated with a threshold number of day sessions within a corresponding time period; and establishing the pending device profile as a trusted device profile, when the pending device profile is associated with the threshold number of day sessions within the corresponding time period.

10. The computer-implemented method of claim 8, further comprising the following operations performed by the processor:

determining whether a number of pending device profiles established in a specified time period exceeds a threshold value; and generating an alert to the user when the number of pending device profiles established in the specified time period exceeds the threshold value.

11. The computer-implemented method of claim 1, wherein the request comprises a request to recover user authentication information, and the method further comprises the following operations performed by the processor:

automatically recovering user authentication information based on the established trusted Internet Protocol address.

12. An apparatus, comprising:

a storage device that stores a set of instructions; and at least one processor coupled to the storage device, the at least one processor being operative with the set of instructions in order to:

obtain a trusted device profile associated with a user, the trusted device profile comprising a trusted Internet Protocol address associated with a device of the user;

identify an Internet Protocol address associated with a request to access a function of a web server, the request being received from the device of the user;

determine whether the identified Internet Protocol address is associated with the trusted device profile;

determine whether a number of day sessions associated with the identified Internet Protocol address exceeds a first threshold value, when the identified Internet Protocol address is not associated with the trusted device profile; and establish the Internet Protocol address as a trusted Internet Protocol address, when the number of day sessions is determined to exceed the first threshold value.

13. The apparatus of claim 12, wherein the at least one processor is further operative with the set of instructions to:

update the trusted device profile to include the established trusted Internet Protocol address.

14. The apparatus of claim 12, wherein the at least one processor is further operative with the set of instructions to:

determine whether a number of trusted Internet Protocol addresses associated with the trusted device profile exceeds a second threshold value; and store the established Internet Protocol address in the trusted device profile when the number of trusted Internet Protocol addresses is determined not to exceed the second threshold value.

15. The apparatus of claim 12, wherein the at least one processor is further operative with the set of instructions to:

determine whether a number of trusted Internet Protocol addresses associated with the trusted device profile exceeds a second threshold value;

remove a trusted Internet Protocol address associated with the trusted device profile when the number of trusted Internet Protocol addresses is determined to exceed the second threshold value; and store the established Internet Protocol address in the trusted device profile.

16. The apparatus of claim 15, wherein:

each trusted Internet Protocol address is associated with a time stamp; and removing the trusted Internet Protocol address further comprises removing the trusted Internet Protocol address associated with the earliest time stamp.

17. The apparatus of claim 12, wherein the request is associated with session information, the session information comprising at least one of a first identifier associated with the user and a second identifier associated with the user device, and wherein the at least one processor is further operative with the set of instructions to:

determine whether the session information corresponds to at least one of an existing device profile or a pending device profile, when the request fails to be associated with a trusted device profile.

18. The apparatus of claim 17, wherein the at least one processor is further operative with the set of instructions to:

when the session information corresponds to the existing device profile, identify a number of day sessions associated with the existing device profile;

determine whether the identified number of day sessions exceeds a threshold value; and establish the existing device profile as a pending device profile, when the number of day sessions exceeds the threshold value.

19. The apparatus of claim 17, wherein the at least one processor is further operative with the set of instructions to:

when the session information corresponds to the pending device profile, determine whether the pending device profile is associated with a threshold number of day sessions within a corresponding time period; and establish the pending device profile as a trusted device profile, when the pending device profile is associated with the threshold number of day sessions within the corresponding time period.

20. A tangible, non-transitory computer-readable memory device that stores a set of instructions that, when executed by at least one processor, cause the at least one processor to perform operations comprising:

obtaining a trusted device profile associated with a user, the trusted device profile comprising a trusted Internet Protocol address associated with a device of the user;

identifying an Internet Protocol address associated with a request to access a function of a web server, the request being received from the device of the user;

determining whether the identified Internet Protocol address is associated with the trusted device profile;

determining whether a number of day sessions associated with the identified Internet Protocol address exceeds a first threshold value, when the identified Internet Protocol address is not associated with the trusted device profile; and establishing the Internet Protocol address as a trusted Internet Protocol address, when the number of day sessions is determined to exceed the first threshold value.

\* \* \* \* \*